(12) United States Patent
Godefroid et al.

(10) Patent No.: US 8,549,486 B2
(45) Date of Patent: Oct. 1, 2013

(54) ACTIVE PROPERTY CHECKING

(75) Inventors: Patrice Godefroid, Mercer Island, WA (US); Michael Y. Levin, Sammamish, WA (US); David Molnar, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 1286 days.

(21) Appl. No.: 12/106,811

(22) Filed: Apr. 21, 2008

(65) Prior Publication Data

US 2009/0265692 A1 Oct. 22, 2009

(51) Int. Cl.
*G06F 9/44* (2006.01)

(52) U.S. Cl.
USPC .......................................... 717/128

(58) Field of Classification Search
USPC ................................. 717/124, 128
See application file for complete search history.

(56) References Cited

U.S. PATENT DOCUMENTS

| | | | | |
|---|---|---|---|---|
| 6,658,651 | B2 * | 12/2003 | O'Brien et al. | 717/127 |
| 7,058,910 | B2 * | 6/2006 | Bharadwaj et al. | 703/2 |
| 7,089,542 | B2 * | 8/2006 | Brand et al. | 717/143 |
| 7,346,486 | B2 * | 3/2008 | Ivancic et al. | 703/22 |
| 7,478,367 | B2 * | 1/2009 | Morgan et al. | 717/124 |
| 7,584,455 | B2 * | 9/2009 | Ball | 717/124 |
| 7,624,304 | B2 * | 11/2009 | Thiagarajan et al. | 714/25 |
| 7,661,094 | B2 * | 2/2010 | Blevin et al. | 717/130 |
| 7,945,898 | B1 * | 5/2011 | Episkopos et al. | 717/124 |
| 8,122,436 | B2 * | 2/2012 | Costa et al. | 717/128 |
| 2001/0010091 | A1 * | 7/2001 | Noy | 716/4 |
| 2002/0087949 | A1 * | 7/2002 | Golender et al. | 717/124 |
| 2005/0081104 | A1 * | 4/2005 | Nikolik | 714/38 |
| 2006/0010428 | A1 | 1/2006 | Rushby et al. | |
| 2006/0080389 | A1 * | 4/2006 | Powers et al. | 709/203 |
| 2006/0242466 | A1 | 10/2006 | Tillmann et al. | |
| 2006/0253739 | A1 | 11/2006 | Godefroid et al. | |
| 2006/0265691 | A1 | 11/2006 | Klinger et al. | |
| 2007/0033443 | A1 * | 2/2007 | Tillmann et al. | 714/45 |
| 2007/0033576 | A1 | 2/2007 | Tillmann et al. | |
| 2007/0157169 | A1 | 7/2007 | Chen et al. | |
| 2007/0168988 | A1 * | 7/2007 | Eisner et al. | 717/126 |
| 2008/0082968 | A1 * | 4/2008 | Chang et al. | 717/128 |
| 2009/0113187 | A1 * | 4/2009 | Hansen et al. | 712/225 |
| 2009/0132861 | A1 * | 5/2009 | Costa et al. | 714/45 |
| 2009/0132999 | A1 * | 5/2009 | Reyes | 717/124 |

OTHER PUBLICATIONS

Using Genetic Algorithms to Aid Test-Data Generation for Data-Flow Coverage, 14th Asia-Pacific Software Engineering Conference, 1530-1362/07 2007 IEEE, Ghiduk et al.*

(Continued)

*Primary Examiner* — Don Wong
*Assistant Examiner* — Daxin Wu
(74) *Attorney, Agent, or Firm* — Lee & Hayes, PLLC

(57) ABSTRACT

An exemplary method includes providing software for testing; during execution of the software, performing a symbolic execution of the software to produce path constraints; injecting issue constraints into the software where each issue constraint comprises a coded formula; solving the constraints using a constraint solver; based at least in part on the solving, generating input for testing the software; and testing the software using the generated input to check for violations of the injected issue constraints. Such a method can actively check properties of the software. Checking can be performed on a path for a given input using a constraint solver where, if the check fails for the given input, the constraint solver can also generate an alternative input for further testing of the software. Various exemplary methods, devices, systems, etc., are disclosed.

20 Claims, 15 Drawing Sheets

(56) References Cited

OTHER PUBLICATIONS

"Automatic, evolutionary test data generation for dynamic software testing", Sofokleous et al, The Journal of Systems and Software 81 (2008) 1883-1898, Available online Jan. 18, 2008.*

Automatic test data generation for path testing using Gas, Information Sciences 131 (2001) 47-64, Lin et al.*

Automatic Test Data Generation using Constraint Solving Techniques, Got;oeb, et al., ISSTA 98 Clearwater Beach Florida USA, 1998.*

"Active Property Checking", Godefroid et al., 2008 ACM 978-1-60558-468-Mar. 8, 2010.*

"Generalized Symbolic Execution for Model Checking and Testing". Khurshid et al., TACAS 2003, LNCS 2619, pp. 553-568, 2003.*

Jackson, et al., "Finding Bugs with a Constraint Solver", at <<http://sdg.csail.mit.edu/pubs/2000/issta00.pdf>>, ACM, 2000, pp. 12.

Artho, et al., "Combining test case generation and runtime verification", at <<http://ase.arc.nasa.gov/visser/symbolicRuntime.pdf>>, Elsevier B.V., 2004, pp. 26.

Godefroid, "Compositional Dynamic Test Generation", at <<http://www.inf.ethz.ch/personal/daniekro/classes/se-sem/ss2007/papers/vijay/godefroid.pdf>>, ACM, 2007, pp. 47-54.

Cadar, et al., "EXE: A System for Automatically Generating Inputs of Death using Symbolic Execution", available at least as early as Sep. 5, 2007, at <<http://hci.stanford.edu/cstr/reports/2006-01.pdf>>, pp. 20.

* cited by examiner

EXEMPLARY SIDE-BY-SIDE EVALUATION
(CONCRETE AND SYMBOLIC)
200

$$\text{X-ASN} \frac{\Delta \vdash e \to v \quad \Delta' = \Delta(x \mapsto v) \quad \Sigma \vdash e \to sv \quad \Sigma' = \Sigma(x \mapsto sv)}{\langle x := e; C, \Delta, \Sigma, pc \rangle \to \langle C, \Delta', \Sigma', pc \rangle}$$

$$\text{X-IF1} \frac{\Delta \vdash e \to \text{true} \quad \Sigma \vdash e \to sv \quad pc' = pc \wedge sv}{\langle \text{if } e \text{ then } C \text{ else } C', \Delta, \Sigma, pc \rangle \to \langle C, \Delta, \Sigma, pc' \rangle}$$

$$\text{X-IF2} \frac{\Delta \vdash e \to \text{false} \quad \Sigma \vdash e \to sv \quad pc' = pc \wedge \neg sv}{\langle \text{if } e \text{ then } C \text{ else } C', \Delta, \Sigma, pc \rangle \to \langle C', \Delta, \Sigma, pc' \rangle}$$

FIG. 2

EXEMPLARY TYPING
300

T-VAR $$\dfrac{}{\Gamma \vdash x : \Gamma(x)}$$

T-BC $$\dfrac{}{\Gamma \vdash b : \texttt{Bool}}$$

T-IC $$\dfrac{}{\Gamma \vdash i : \{x : \texttt{Int} \mid x == i\}}$$

T-OP $$\dfrac{\Gamma \vdash o_1 : S_1 \ldots \Gamma \vdash o_n : S_n \quad \Gamma \vdash op(S_1 \ldots S_n) : T}{\Gamma \vdash op(o_1 \ldots o_n) : T}$$

T-SUB $$\dfrac{\Gamma \vdash e : S \quad S <: T}{\Gamma \vdash e : T}$$

T-IF $$\dfrac{\Gamma' = \Gamma \cap G \quad \Gamma' \vdash e : \texttt{Bool} \quad \Gamma' \vdash C \quad \Gamma' \vdash C'}{\Gamma \vdash (G)\texttt{if } e \texttt{ then } C \texttt{ else } C'}$$

T-ASN $$\dfrac{\Gamma' = \Gamma \cap G \quad \Gamma' \vdash e : S \quad \Gamma \vdash x : U \quad T \cap S <: U \quad \Gamma' \vdash C}{\Gamma \vdash (G)x := \langle T \rangle e; C}$$

T-STOP $$\dfrac{}{\Gamma \vdash \texttt{stop}}$$

FIG. 3

EXEMPLARY CONCRETE EVALUATION
400

E-VAR $$\overline{\Delta \vdash x \to \Delta(x)}$$

E-OP $$\frac{\Delta \vdash o_1 \to v_1 \ldots \Delta \vdash o_n \to v_n \quad \Delta(\text{op}) = \tilde{op} \quad v = \tilde{op}(v_1 \ldots v_n)}{\Delta \vdash \text{op}(o_1 \ldots o_n) \to v}$$

E-IF1 $$\frac{\Delta \vdash G \quad \Delta \vdash e \to \text{true}}{\langle (G)\text{if } e \text{ then } C \text{ else } C', \Delta \rangle \to \langle C, \Delta \rangle}$$

E-IF2 $$\frac{\Delta \vdash G \quad \Delta \vdash e \to \text{false}}{\langle (G)\text{if } e \text{ then } C \text{ else } C', \Delta \rangle \to \langle C', \Delta \rangle}$$

E-ASN $$\frac{\Delta \vdash G \quad \Delta \vdash e \to v \quad v \in T \quad \Delta' = \Delta(x \mapsto v)}{\langle (G)x := \langle T \rangle e; C, \Delta \rangle \to \langle C, \Delta' \rangle}$$

FIG. 4

EXEMPLARY COMPILATION
500

C-VAR1
$$\frac{\Gamma(x) <:^{ok}_{alg} S}{\Gamma \vdash x : S \Rightarrow \emptyset}$$

C-VAR2
$$\frac{\Gamma(x) <:^{?}_{alg} S}{\Gamma \vdash x : S \Rightarrow \{x : S \cap \Gamma(x)\}}$$

C-BC
$$\overline{\Gamma \vdash b : \texttt{Bool} \Rightarrow \emptyset}$$

C-IC
$$\frac{\{x : \texttt{Int} | x == i\} <:^{ok}_{alg} S}{\Gamma \vdash i : S \Rightarrow \emptyset}$$

C-OP
$$\frac{\Gamma \vdash o_1 : S_1 \Rightarrow G' \ldots \Gamma \vdash o_n : S_n \Rightarrow G_n \quad \Gamma \vdash op(S_1 \ldots S_n) : T}{\Gamma \vdash op(o_1 \ldots o_n) : T \Rightarrow \cap_i G_i}$$

C-IF
$$\frac{\Gamma' = \Gamma \cap G \quad \Gamma' \vdash e : \texttt{Bool} \Rightarrow G' \quad \Gamma'' = \Gamma' \cap G' \quad \Gamma'' \vdash C_1 \Rightarrow C'_1 \quad \Gamma'' \vdash C_2 \Rightarrow C'_2}{\Gamma \vdash (G) \texttt{if } e \texttt{ then } C_1 \texttt{ else } C_2 \Rightarrow (G \cap G') \texttt{if } e \texttt{ then } C'_1 \texttt{ else } C'_2}$$

C-ASN1
$$\frac{\Gamma' = \Gamma \cap G \quad \Gamma \vdash x : U \quad \Gamma' \vdash e : S \Rightarrow G' \quad T \cap S <:^{ok}_{alg} U \quad \Gamma'' = \Gamma' \cap G' \quad \Gamma'' \vdash C \Rightarrow C'}{\Gamma \vdash \langle(G)x := \langle T\rangle e; C\rangle \Rightarrow \langle(G \cap G')x := \langle T\rangle e; C'\rangle}$$

C-ASN2
$$\frac{\Gamma' = \Gamma \cap G \quad \Gamma \vdash x : U \quad \Gamma' \vdash e : S \Rightarrow G' \quad T \cap S <:^{?}_{alg} U \quad \Gamma'' = \Gamma' \cap G' \quad \Gamma'' \vdash C \Rightarrow C'}{\Gamma \vdash \langle(G)x := \langle T\rangle e; C\rangle \Rightarrow \langle(G \cap G')x := \langle T \cap U\rangle e; C'\rangle}$$

C-STOP
$$\overline{\Gamma \vdash \texttt{stop} \Rightarrow \texttt{stop}}$$

FIG. 5

EXEMPLARY SIDE-BY-SIDE EVALUATION
600

$$\text{X-IF1} \quad \frac{\Delta \vdash G \quad \Delta \vdash e \rightarrow \text{true}}{\langle (G) \text{if } e \text{ then } C \text{ else } C', \Delta, \Sigma, pc \rangle \rightarrow \langle C, \Delta, \Sigma, pc' \rangle \cdot \Phi}$$

$$\text{X-IF2} \quad \frac{\Delta \vdash G \quad \Delta \vdash e \rightarrow \text{false}}{\langle (G) \text{if } e \text{ then } C \text{ else } C', \Delta, \Sigma, pc \rangle \rightarrow \langle C', \Delta, \Sigma, pc' \rangle \cdot \Phi}$$

$$\text{X-ASN} \quad \frac{\begin{array}{ccc} \Delta \vdash G & \Delta \vdash e \rightarrow v & \Delta' = \Delta(x \mapsto v) \\ v \in T & \Sigma \vdash e \rightarrow sv & \Sigma' = \Sigma(x \mapsto sv) \\ \Sigma \vdash G \Rightarrow \Phi_1 & \Sigma \vdash sv \in T \Rightarrow \phi_2 \end{array}}{\langle (G)x := \langle T \rangle e; C, \Delta, \Sigma, pc \rangle \rightarrow \langle C, \Delta', \Sigma', pc \rangle \cdot (\Phi_1 \cup \{\phi_2\})}$$

FIG. 6

EXEMPLARY ACTIVE CHECKING FOR DIVISION BY ZERO
700

PROGRAM 710

$(\emptyset)x_2 := \langle \text{int} \rangle 52$
$(\emptyset) \text{ if } (x_1 > -5)$
  $\text{then } (\emptyset)x_3 := \langle \text{int} \rangle \text{div}(x_2, x_1)$

PROGRAM AFTER CAST INSERTION 720

$(\emptyset)x_2 := \langle \text{int} \rangle 52$
$(\emptyset)\text{if } (x_1 > -5)$
  $\text{then } ((x_1, \text{notzero}))x_3 := \langle \text{int} \rangle \text{div}(x_2, x_1)$

RESULTS 730

$pc = \text{true}, \Phi = \emptyset$
$pc = \alpha > -5, \Phi = \emptyset$
$pc = \alpha > -5, \Phi = \{\alpha \neq 0\}$

FIG. 7

EXEMPLARY TYPES FOR AN INTEGER OVERFLOW/UNDERFLOW CHECKER
800

$$
\begin{aligned}
\text{int} &= \{x : \text{Int} | \text{true}\} \\
\text{uint64\_t} &= \{x : \text{Int} | 0 \leq x < 2^{64}\} \\
\text{int64\_t} &= \{x : \text{Int} | -2^{63} \leq x < 2^{63}\} \\
\text{uint32\_t} &= \{x : \text{Int} | 0 \leq x < 2^{32}\} \\
\text{int32\_t} &= \{x : \text{Int} | -2^{31} \leq x < 2^{31}\} \\
\text{uint16\_t} &= \{x : \text{Int} | 0 \leq x < 2^{16}\} \\
\text{int16\_t} &= \{x : \text{Int} | -2^{15} \leq x < 2^{15}\} \\
\text{uint8\_t} &= \{x : \text{Int} | 0 \leq x < 2^{8}\} \\
\text{int8\_t} &= \{x : \text{Int} | -2^{7} \leq x < 2^{7}\}
\end{aligned}
$$

FIG. 8

EXEMPLARY ACTIVE CHECKERS IMPLEMENTED IN SAGE
900

| Number | Checker         | Number | Checker           |
|--------|-----------------|--------|-------------------|
| 0      | Path Exploration| 7      | Integer Underflow |
| 1      | DivByZero       | 8      | Integer Overflow  |
| 2      | NULL Deref      | 9      | MOVSX Underflow   |
| 3      | SAL NotNull     | 10     | MOVSX Overflow    |
| 4      | Array Underflow | 11     | Stack Smash       |
| 5      | Array Overflow  | 12     | AllocArg Underflow|
| 6      | REP Range       | 13     | AllocArg Overflow |

FIG. 9

EXEMPLARY STATISTICS
1000

| Test | Checkers Injected | Time (sec) | pc size | # checker constraints | # Tests | # Instr. | Symbolic Input Size |
|---|---|---|---|---|---|---|---|
| Media 1 | 0,2,4,5,7,8 | 37 | 67 | 46 | 105 | 3795771 | 65536 |
| Media 2 | 0,1,2,4,5,7,8,9,10,11 | 1226 | 2990 | 6080 | 5122 | 279478553 | 27335 |

FIG. 10

EXEMPLARY STATISTICS
1100

| Media 1 | none | weak | strong | naive |
|---|---|---|---|---|
| Total Time (s) | 16 | 37 | 42 | 37 |
| Solver Time (s) | 5 | 5 | 10 | 5 |
| # Tests Gen | 59 | 70 | 87 | 105 |
| # Disjunctions | N/A | 11 | 11 | N/A |
| Dis. Min/Mean/Max | N/A | 2/4.2/16 | 2/4.2/16 | N/A |
| # Path Constr. | 67 | 67 | 67 | 67 |
| # Checker Constr. | N/A | 46 | 46 | 46 |
| # Solver Calls | 67 | 78 | 96 | 113 |
| Max CtrList Size | 77 | 141 | 141 | 141 |
| Mean CtrList Size | 2.7 | 2.7 | 2.7 | 3 |
| Local Cache Hit | 79% | 81% | 88% | 88% |
| Media 2 | none | weak | strong | naive |
| Total Time (s) | 761 | 973 | 1140 | 1226 |
| Solver Time (s) | 421 | 463 | 601 | 504 |
| # Tests Gen | 1117 | 1833 | 2734 | 5122 |
| # Disjunctions | N/A | 1125 | 1125 | N/A |
| Dis. Min/Mean/Max | N/A | 1/5.4/216 | 1/5.4/216 | N/A |
| # Path Constr. | 3001 | 2990 | 2990 | 2990 |
| # Checker Constr. | N/A | 6080 | 6080 | 6080 |
| # Solver Calls | 3001 | 4115 | 5368 | 9070 |
| Max CtrList Size | 11141 | 91739 | 91739 | 91739 |
| Mean CtrList Size | 368 | 373 | 373 | 372 |
| Local Cache Hit | 39% | 19.5% | 19.5% | 19.5% |

FIG. 11

EXEMPLARY CRASH BUCKET INFORMATION
1200

| Crash Bucket | Kind | 0 | 2 | 4 | 5 | 7 | 8 |
|---|---|---|---|---|---|---|---|
| 1867196225 | NULL | No/W/S | | | | W/S | W/S |
| 1867196225 | ReadAV | No/W | | | | W | W |
| 1277839407 | ReadAV | S | | | | | |
| 1061959981 | ReadAV | | S | | | S | S |
| 1392730167 | ReadAV | S | | | | | |
| 1212954973 | ReadAV | | | | S | S | S |
| 1246509355 | ReadAV | | | | S | W/S | W/S |
| 1527393075 | ReadAV | S | | | | | |
| 1011628381 | ReadAV | | | | | S | W/S |
| 2031962117 | ReadAV | No/W/S | | | | | |
| 286861377 | ReadAV | No/S | | | | | |
| 842674295 | WriteAV | | S | S | | S | S |

FIG. 12

EXEMPLARY CRASH BUCKET INFORMATION
1300

| Crash Bucket | Kind | 0 |
|---|---|---|
| 790577684 | ReadAV | No/W/S |
| 825233195 | ReadAV | No/W/S |
| 795945252 | ReadAV | No/W/S |
| 1060863579 | ReadAV | No/W |

FIG. 13

INFORMATION FOR EXEMPLARY INJECTED CONSTRAINTS
1400

| Media 1  | 0     | 2    | 4    | 5    | 7     | 8     |
|----------|-------|------|------|------|-------|-------|
| Injected | 27612 | 26   | 13   | 13   | 11153 | 11153 |
| Solved   | 18056 | 22   | 2    | 3    | 3179  | 5552  |
| Crashes  | 339   | 22   | 2    | 3    | 139   | 136   |
| Yield    | 1.9%  | 100% | 100% | 100% | 4.4%  | 2.4%  |
| Media 2  | 0     | 1    | 2    | 4    | 5     |       |
| Injected | 13425 | 12   | 2146 | 1544 | 1551  |       |
| Solved   | 4735  | 0    | 61   | 10   | 20    |       |
| Crashes  | 7     | 0    | 0    | 0    | 0     |       |
| Yield    | 1.4%  | N/A  | 0%   | 0%   | 0%    |       |
|          | 7     | 8    | 9    | 10   | 11    |       |
| Injected | 11158 | 11177| 5    | 5    | 10    |       |
| Solved   | 576   | 2355 | 0    | 5    | 0     |       |
| Crashes  | 0     | 0    | 0    | 0    | 0     |       |
| Yield    | 0%    | 0%   | N/A  | 0%   | N/A   |       |

FIG. 14

ACTIVE PROPERTY CHECKING

BACKGROUND

During the last decade, code inspection for standard programming errors has largely been automated with static code analysis. Commercially available static program analysis tools are now routinely used in many software development organizations. These tools are popular because they find many (real) software bugs, thanks to three main ingredients: they are automatic, they are scalable, and they check many properties. In general, a tool that is able to check automatically (with sufficient precision) millions of lines of code against hundreds of coding rules and properties is bound to find on average about one bug (i.e., code error) every thousand lines of code.

As basic code inspection can be achieved using automated code analysis, cost, as part of the software development process, is typically reasonable and manageable. However, a more thorough type of testing, referred to as "software testing", is a more costly part of the software development process that usually accounts for about 50% of the R&D budget of software development organizations.

Software testing relies on so-called "test cases" or more simply "tests". To be efficient, tests should be generated in a relevant manner. For example, tests may be generated on the basis of information acquired from analyzing a program. Automating test generation from program analysis can roughly be partitioned into two groups: static versus dynamic test generation. Static test generation consists of analyzing a program statically to attempt to compute input values to drive its executions along specific program paths. In contrast, dynamic test generation consists in executing a program, typically starting with some random inputs, while simultaneously performing a symbolic execution to collect symbolic constraints on inputs obtained from predicates in branch statements along the execution, and then using a constraint solver to infer variants of the previous inputs in order to steer program executions along alternative program paths. Since dynamic test generation extends static test generation with additional runtime information, it can be more powerful.

While aspects of scalability of dynamic test generation have been recently addressed, significant issues exist as to how to dynamically check many properties simultaneously, thoroughly and efficiently, to maximize the chances of finding bugs during an automated testing session.

Traditional runtime checking tools (e.g., Purify, Valgrind and AppVerifier) check a single program execution against a set of properties (such as the absence of buffer overflows, uninitialized variables or memory leaks). Such techniques are referred to herein as traditional passive runtime property checking. As an example, consider the program: int divide(int n, int d){// n and d are inputs return (n/d); // division-by-zero error if d==0}. The program "divide" takes two integers n and d as inputs and computes their division. If the denominator d is zero, an error occurs. To catch this error, a traditional runtime checker for division-by zero would simply check whether a concrete value of d satisfies (d==0) just before the division is performed for a specific execution run, but it would not provide any insight or guarantee concerning other executions. Further, testing this program with random values for n and d is unlikely to detect the error, as d has only one chance out of $2^{32}$ to be zero if d is a 32-bit integer. Static (and even dynamic) test generation techniques that attempt to cover specific or all feasible paths in a program will also likely miss the error since the program has a single program path which is covered no matter what inputs are used.

While an attempt at checking properties at runtime on a dynamic symbolic execution of a program has been reported, such an approach is likely to return false alarms whenever symbolic execution is imprecise, which is often the case in practice.

Various exemplary methods, devices, systems, etc., are described herein pertain to active property checking. Such techniques can extend runtime checking by checking whether the property is satisfied by all program executions that follow the same program path.

SUMMARY

An exemplary method includes providing software for testing; during execution of the software, performing a symbolic execution of the software to produce path constraints; injecting issue constraints into the software where each issue constraint comprises a coded formula; solving the constraints using a constraint solver; based at least in part on the solving, generating input for testing the software; and testing the software using the generated input to check for violations of the injected issue constraints. Such a method can actively check properties of the software. Checking can be performed on a path for a given input using a constraint solver where, if the check fails for the given input, the constraint solver can also generate an alternative input for further testing of the software. Various exemplary methods, devices, systems, etc., are disclosed.

DESCRIPTION OF THE DRAWINGS

Non-limiting and non-exhaustive examples are described with reference to the following figures:

FIG. 2 is a series of formulas for exemplary side-by-side evaluation of code;

FIG. 3 is a series of formulas for exemplary typing of code;

FIG. 4 is a series of formulas for an exemplary concrete evaluation of code;

FIG. 5 is a series of formulas for an exemplary compliation of code;

FIG. 6 is a series of formulas for an exemplary side-by-side evaluation of code;

FIG. 7 is a listing of a program, the program after cast insertion and corresponding path constraint results;

FIG. 8 is a series of exemplary types for an integer overflow/underflow checker;

FIG. 9 is a table of exemplary active checkers implemented in various trials;

FIG. 10 is a table of exemplary statistics for trials on two different media (i.e., software programs);

FIG. 11 is a table of exemplary statistics for trials on the two different media;

FIG. 12 is a table of exemplary crash bucket information for various kinds of checked for issues;

FIG. 13 is a table of exemplary crash bucket information for a particular kind of checked for issue;

FIG. 14 is a table of information pertaining to various exemplary injected constraints.

DETAILED DESCRIPTION

Various exemplary methods, devices, systems, etc., actively search for property violations in software. For example, consider the example program "divide" presented in the Background section. By inserting a test "if (d==0) error ( )" before the division (n/d), an attempt can be made to generate an input value for d that satisfies the constraint (d==0), which is now present in the program path. This attempt to generate an input value for d can be used to detect an error. Accordingly, active property checking injects, at runtime, additional symbolic constraints on inputs that, when solvable by a constraint solver, will generate new test inputs leading to potential or certain property violations. In other words, active property checking extends runtime checking by checking whether a property is satisfied by all program executions that follow the same program path. As described herein, such a check can be performed on a dynamic symbolic execution of a given program path using a constraint solver. If the check fails, the constraint solver can generate an alternative program input triggering a new program execution that follows the same program path but exhibits a property violation. Such checking is referred to as "active" checking because a constraint solver is used to "actively" look for assignments that cause a runtime check to fail. In general, an assignment output by a constraint solver is readily mappable to an input for the program undergoing testing.

Combined with systematic dynamic test generation, which attempts to exercise all feasible paths in a program, active property checking defines a new form of program verification.

Active property checking extends the concept of checking properties at runtime on a dynamic symbolic execution of the program by combining it with constraint solving and test generation in order to further check using a new test input whether a property is actually violated as predicted by a prior imperfect symbolic execution. In such a manner, false alarms are eliminated (e.g., never reported). Active property checking can also be viewed as systematically injecting assertions all over a program under test, and then using dynamic test generation to check for violations of those assertions.

As described herein, test generation is automated by leveraging advances in program analysis, automated constraint solving, and increasing computation power available on modern computers. To replicate the success of static program analysis in the testing space, as described herein, various exemplary techniques for active property checking are automatable, scalable and able to check many properties.

Figure 1:
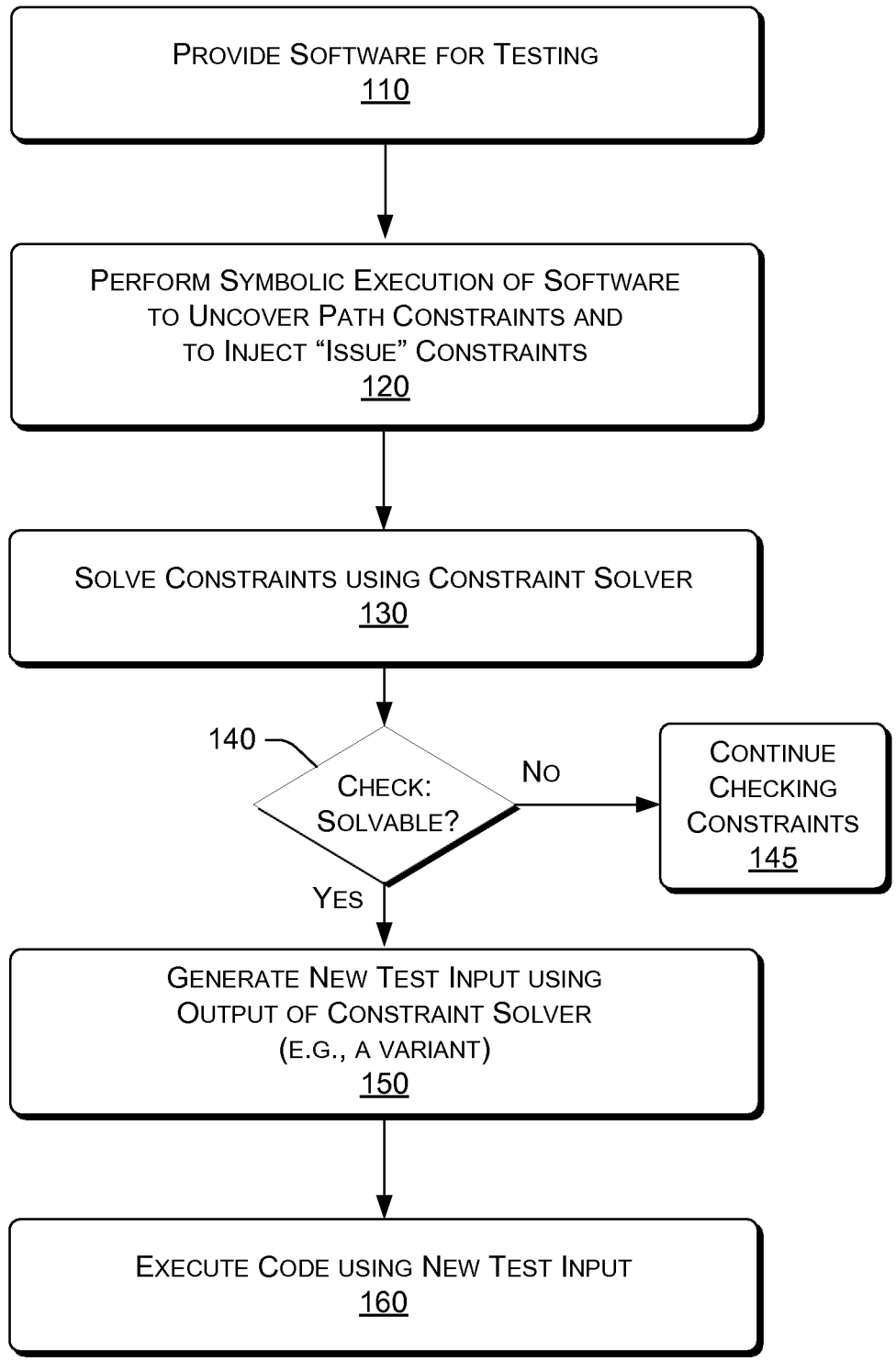
FIG. 1 is a diagram of an exemplary method for active property checking of software.

FIG. 1 shows an exemplary method 100 for active property checking. The method 100 refers to software, which may be executable code such as a binary. As explained, other arrangements of various steps in the method 100 are possible while still achieving active property checking.

As shown in FIG. 1, the method 100 can systematically inject constraints (e.g., assertions) throughout software and then use a constraint solver to generate new input to check for violation of the injected constraints. In a provision block 110, software is provided for testing. In a performance block 120 symbolic execution of the software is performed to uncover path constraints (e.g., as conditional statements) and to inject constraints for one or more issues, which may be referred to as "issue" constraints. As described herein, an active checker may be used to inject constraints associated with a particular software issue (e.g., division by zero, array bounds issue, etc.). An injected constraint can be a coded formula associated with a particular issue that may arise, for example, during normal execution of the software. The performance block 120 may perform its actions in parallel with "normal" or "runtime" execution of the software.

Given the constraints (e.g., a path constraint and an associated injected constraint on that path), a solution block 130 solves the constraints using a constraint solver. As described in more detail below, a constraint solver determines a solution exists and, if so, it can provide as an output an assignment that satisfies the constraints; otherwise, the constraint solver indicates that no solution exists. The existence of solution infers that a violation may occur, i.e., that the associated "looked for" issue may exist in the software. Accordingly, in the method 100 of FIG. 1, a decision block 140 decides or "checks" whether the constraints are solvable. If the decision block 140 decides that the constraints are not solvable, then the method 100 continues at block 145, which may simply act to continue checking constraints. However, if the decision block 140 decides that a solution exists (e.g., a failure may occur for the issue), then a generation block 150 generates new test input. As explained, the new test input is based at least in part on output from the constraint solver, which may be mapped to input for the software undergoing testing. Given the new test input, an execution block 160 executes the software to check for violation of the constraints (i.e., existence of looked for the issue).

Overall, the method 100 provides for active property checking as a constraint solver actively uses injected constraints to identify inputs that cause a runtime check to fail (e.g., property violations). Such an approach can be combined with dynamic test generation (e.g., to exercise all feasible paths in code) to generate new tests for code verification.

In general, the exemplary method 100 involves the following three processes: normal execution of software; symbolic execution and active checking to insert constraints. These three processes may operate in parallel or in a disjointed manner. For example, a disjointed manner may execute the software and acquire a trace that is then used for symbolic execution and active checking. Various techniques are described herein for parallel operation that can optimize constraint solving (e.g., grouping constraints, etc.). While such techniques are presented that pertain to examples for parallel operation, other techniques and modes of operation may be used. Hence, in various examples, the order may be altered while still achieving active property checking.

As described herein, a constraint can be injected as a formula (e.g., a line or segment of code) into software destined for testing. Such a formula may be generated by a so-called active checker. In general, checkers can be classified as passive checkers or active checkers. A passive checker for a property is a function that takes as input a finite program execution and returns an error message (e.g. "fail") if the property is violated for the finite program execution. In contrast, an active checker for a property is a function that takes as input a finite program execution and returns a formula such that the formula is satisfiable if and only if there exists some finite program execution that violates the property (e.g., along a common, specified "path constraint").

As mentioned, a constraint can be a formula, for example, a formula output by an active checker. Examples of active checkers and corresponding constraints include those for division by zero, array bounds and null pointer de-reference. With respect to array bounds, an active checker may insert formulas as symbolic tests prior to all array accesses. The foregoing list of active checkers is not exhaustive. Further, it is important to note that multiple active checkers can be used simultaneously. Yet further, if unrestrained, active checkers may inject many constraints all over program executions; hence, various exemplary techniques can be used optimize injection of constraints to make active tracking more tractable in practice (e.g., by minimizing calls to a constraint solver, minimizing formulas, caching strategies, etc.).

As described herein, an exemplary method can include performing a symbolic execution of software to produce path constraints; injecting issue constraints into the software where each issue constraint comprises a coded formula; solving the constraints using a constraint solver; based at least in part on the solving, generating input for testing the software;

and testing the software using the generated input to check for violations of the injected issue constraints.

As described herein, static and dynamic type checking can be extended with active type checking. Efficient implementation of active property checking is presented along with trial results from testing of large, shipped WINDOWS® applications, where active property checking was able to detect several new security-related bugs.

More specifically, the discussion that follows (i) formalizes active property checking semantically and shows how it provides a new form of program verification when combined with systematic dynamic test generation; (ii) presents a type system that combines static, dynamic and active checking for a simple imperative language (e.g., to clarify the connection, difference and complementarity between active type checking and traditional static and dynamic type checking); (iii) explains how to implement active checking efficiently by minimizing the number of calls to a constraint solver, minimizing formula sizes and using two constraint caching schemes; (iv) describes an exemplary implementation of active property checking in SAGE (see, e.g., P. Godefroid, M. Y. Levin, and D. Molnar. Automated Whitebox Fuzz Testing. Technical Report MS-TR-2007-58, Microsoft, May 2007), a tool for security testing of file-reading WINDOWS® applications that performs systematic dynamic test generation of x86 binaries; and (v) results of trials with large, shipped WINDOWS® applications where active property checking was able to detect several new bugs in those applications.

Systematic Dynamic Test Generation

Dynamic test generation consists of running a program P under test both concretely, executing the actual program, and symbolically, calculating constraints on values stored in program variables x and expressed in terms of input parameters $\alpha$. In general, side-by-side concrete and symbolic executions are performed using a concrete store $\Delta$ and a symbolic store $\Sigma$, which are mappings from program variables to concrete and symbolic values, respectively. A symbolic value is any expression sv in some theory T where all free variables are exclusively input parameters $\alpha$. For any variable x, $\Delta(x)$ denotes the concrete value of x in $\Delta$, while $\Sigma(x)$ denotes the symbolic value of x in $\Sigma$. The judgment $\Delta \vdash e \rightarrow v$ means that that an expression e reduces to a concrete value v, and similarly $\Sigma \vdash e \rightarrow sv$ means that e reduces to a symbolic value sv. For notational convenience, it is assumed that $\Sigma(x)$ is always defined and is simply $\Delta(x)$ by default if no expression in terms of inputs is associated with x. The notation $\Delta(x \rightarrow c)$ denotes updating the mapping $\Delta$ so that x maps to c.

The program P manipulates the memory (concrete and symbolic stores) through statements, or commands, that are abstractions of the machine instructions actually executed. A command can be an assignment of the form x:=e (where x is a program variable and e is an expression), a conditional statement of the form if e then C else C' where e denotes a Boolean expression, and C and C' are continuations denoting the unique next statement to be evaluated (programs considered here are thus sequential and deterministic), or stop corresponding to a program error or normal termination.

Given an input vector $\vec{a}$ assigning a value to every input parameter $\alpha$, the evaluation of a program defines a unique finite program execution $s_0$

that executes the finite sequence $C_1 \ldots C_n$ of commands and goes through the finite sequence $s_1 \ldots s_n$ of program states. Each program state is a tuple $\{C, \Delta, \Sigma, pc\}$ where C is the next command to be evaluated, and pc is a special meta-variable that represents the current path constraint. For a finite sequence w of statements (i.e., a control path w), a path constraint $pc_w$ is a formula of theory T that characterizes the input assignments for which the program executes along w. To simplify the presentation, it is assumed that all the program variables have some default initial concrete value in the initial concrete store $\Delta_0$, and that the initial symbolic store $\Sigma_0$ identifies the program variables v whose values are program inputs (for all those, we have $\Sigma_0(v)=\alpha$ where $\alpha$ is some input parameter). Initially, pc is defined to true.

FIG. 2 shows some exemplary main rules for side-by-side execution. The X-ASN rule shows how both the concrete store and symbolic store are updated after an assignment. The rules X-IF1 and X-IF2 show how the path constraint pc is updated after each conditional statement. First the Boolean expression e is evaluated to determine if its concrete value is true or false and its symbolic value sv. Next, depending on the result, a new conjunct sv or $\neg$ sv is added to the current path constraint pc. For simplicity, it is assumed that all program executions eventually terminate by executing the command stop.

Systematic dynamic test generation consists of systematically exploring all feasible program paths of the program under test by using path constraints and a constraint solver. By construction, a path constraint represents conditions on inputs that need be satisfied for the current program path to be executed. Given a program state $<C, \Delta, \Sigma, pc>$ and a constraint solver for theory T, if C is a conditional statement of the form if e then C else C', any satisfying assignment to the formula $pc \wedge sv$ (respectively $pc \wedge \neg sv$) defines program inputs that will lead the program to execute the then (resp. else) branch of the conditional statement. By systematically repeating this process, such a directed search can enumerate all possible path constraints and eventually execute all feasible program paths.

Such a directed search is exhaustive provided that the generation of the path constraint (including the underlying symbolic execution) and the constraint solver for the given theory T are both sound and complete, that is, for all program paths w, the constraint solver returns a satisfying assignment for the path constraint $pc_w$ if and only if the path is feasible (i.e., there exists some input assignment leading to its execution). In this case, in addition to finding errors such as the reachability of bad program statements (like assert (0)), a directed search can also prove their absence, and therefore obtain a form of program verification.

Accordingly, Theorem 1 is presented: Given a program P as defined above, a directed search using a path constraint generation and a constraint solver that are both sound and complete exercises all feasible program paths exactly once.

In this case, if a program statement has not been executed when the search is over, this statement is not executable in any context.

In practice, path constraint generation and constraint solving are usually not sound and complete. When a program expression cannot be expressed in the given theory T decided by the constraint solver, it can be simplified using concrete values of sub-expressions, or replaced by the concrete value of the entire expression. For example, if the solver handles only linear arithmetic, symbolic sub-expressions involving multiplications can be replaced by their concrete values.

Active Checkers

Even when sound and complete, a directed search based on path exploration alone can miss errors that are not path invariants, i.e., that are not violated by all concrete executions executing the same program path, or errors that are not caught by a program's runtime environment. For example, consider the following program:

```
1 int buggy(int x)10 {    // x is an input
2 int buf[20];
3 buf[30]=0;    // buffer overflow independent of x
4 if(x>20)
5 return 0;
6 else
7 return buf[x]; // buffer overflow if x==20
8 }
```

This program takes as (untrusted) input an integer value stored in variable x. A buffer overflow in line 3 will be detected at runtime only if a runtime checker monitors buffer accesses. Such a runtime checker would thus check whether any array access of the form a[x] satisfies the condition $0 \leq \Delta(x) < b$ where $\Delta(x)$ is the concrete value of array index x and b denotes the bound of the array a (b is 20 for the array buf[ ] in the foregoing example). As described herein, such a traditional runtime checker for concrete values is referred to as a passive checker.

Moreover, a buffer overflow is also possible in line 7 provided x==20, yet a directed search focused on path exploration alone may miss this error. The reason is that the only condition that will appear in a path constraint for this program is x>20 and its negation. Since most input values for x that satisfy ¬(x>20) do not cause the buffer overflow, the error will likely be undetected with a directed search as already defined.

To catch the buffer overflow on line 7, the program should be extended with a symbolic test $0 \leq \Sigma(x) < b$ (where $\Sigma(x)$ denotes the symbolic value of array index x) just before the buffer access buf[x] on line 7. This approach will force the condition $0 \leq x \leq 20$ to appear in the path constraint of the program in order to refine the partitioning of its input values. An exemplary active checker for array bounds can be viewed as systematically adding such symbolic tests before all array accesses.

Formally, passive checkers and active checkers may be defined as follows.

Definition 1. A passive checker for a property $\pi$ is a function that takes as input a finite program execution w, and returns "fail $\pi$" iff the property $\pi$ is violated by w. Because it is assumed all program executions terminate, properties considered here are safety properties. Runtime property checkers like Purify, Valgrind and AppVerifier are examples of tools implementing passive checkers.

Definition 2. Let $pc_w$ denote the path constraint of a finite program execution w. An active checker for a property $\pi$ is a function that takes as input a finite program execution w, and returns a formula $\phi_c$ such that the formula $pc_w \land \neg \phi_c$ is satisfiable iff there exists a finite program execution w violating property $\pi$ and such that $pc_{w'} = pc_w$.

Exemplary active checkers can be implemented in various ways, for instance using property monitors/automata, program rewrite rules or type checking. They can use private memory to record past events (leading to a current program state), but, in general, they are not allowed any side effect on a program.

Further below, detailed examples are presented of how active checkers can be formally defined and implemented. Below, are some examples of specifications for exemplary active property checkers.

Example 1 is Division By Zero: Given a program state where the next statement involves a division by a denominator d which depends on an input (i.e., such that $\Sigma(d) \neq \Delta(d)$), an active checker for division by zero outputs the constraint $\phi_{DIV} = (\Sigma(d) \neq 0)$.

Example 2 is Array Bounds: Given a program state where the next statement involves an array access a[x] where x depends on an input (i.e., is such that $\Sigma(x) \neq \Delta(x)$), an active checker for array bounds outputs the constraint $\phi_{Buf} = (0 \leq \Sigma(x) < b)$ where b denotes the bound of the array a.

Example 3 is NULL Pointer Dereference: Consider a program expressed in a language where pointer dereferences are allowed (unlike our simple language SimpL). Given a program state where the next statement involves a pointer dereference *p where p depends on an input (i.e., such that $\Sigma(p) \neq \Delta(p)$), an active checker for NULL pointer dereference generates the constraint $\phi_{NULL} = (\Sigma(p) \neq NULL)$.

Multiple active checkers can be used simultaneously by simply considering separately the constraints they inject in a given path constraint. In such a way, they are guaranteed not to interfere with each other (since they have no side effects). A discussion of how to combine active checkers to maximize performance appears further below.

By applying an active checker for a property $\pi$ to all feasible paths of a program P, we can obtain a form of verification for this property, that is stronger than Theorem 1.

Consider Theorem 2: Given a program P as defined above, if a directed search (1) uses a path constraint generation and constraint solvers that are both sound and complete, and (2) uses both a passive and an active checker for a property $\pi$ in all program paths visited during the search, then the search reports "fail $\pi$" iff there exists a program input that leads to a finite execution violating $\phi$.

Proof Sketch: Assume there is an input assignment that leads to a finite execution w of P violating $\pi$. Let $pc_w$ be the path constraint for the execution path w. Since path constraint generation and constraint solving are both sound and complete, we know by Theorem 1 that w will eventually be exercised with some concrete input assignment $\alpha$. If the passive checker for $\pi$ returns "fail $\pi$" for the execution of P obtained from input $\alpha$ (for instance, if $\alpha = a$), the proof is finished. Otherwise, the active checker for $\pi$ will generate a formula $\phi_c$ and call the constraint solver with the query $pc_w \land \neg \phi_c$. The existence of $\alpha$ implies that this query is satisfiable, and the constraint solver will return a satisfying assignment from which a new input assignment $\alpha$ is generated ($\alpha$ could be $\alpha$ itself). By construction, running the passive checker for $\pi$ on the execution obtained from that new input $\alpha$ will return "fail $\pi$".

Note that in the foregoing example, both passive checking and active checking are used to obtain the result (see also the example for buffer overflow). In practice, however, symbolic execution, path constraint generation, constraint solving, passive and active property checking are typically not sound and complete, and therefore active property checking reduces to testing.

Active Type Checking

An exemplary framework is described below for specifying checkers, which illustrates their complementarity with traditional static and dynamic checking. The framework includes aspects of "hybrid type checking" as it observes that type-checking a program statically is undecidable in general, especially for type systems that permit expressive specifications. Therefore, the framework aims to satisfy the need to handle programs for which one cannot decide statically that the program violates a property, but may in fact satisfy the property. The hybrid type checking approach can automatically insert run-time checks for programs in a language $\lambda^H$ in cases where typing cannot be decided statically.

The exemplary frame extends aspects of hybrid property checking to active checking. A particular example, implements active checking with a simple imperative language CSimpL and a type system that supports integer refinement types, in which types are defined by predicates, and subtyping is defined by logical implication between these predicates.

Also described below is an exemplary method for compiling programs that can either statically reject a program as ill-typed, or insert casts to produce a well-typed program. In this example, each cast performs a run-time membership check for a given type and raises an error if a run-time value is not of the desired type.

A key property of various exemplary approaches is that the run-time check is a passive checker in the sense of a post-compilation program computes a function on its own execution that returns "fail φ" if and only if the run-time values violate a cast's type membership check.

Define below is a side-by-side symbolic and concrete evaluation of the language CSimpL to generate symbolic path conditions from program executions and symbolic membership checks from casts. As described herein, these symbolic membership checks are active checkers with respect to the run-time membership checks. Therefore, a type environment can be thought of as specifying a property: a first attempt is made to prove that this property holds statically or rejects the program statically. Where decisions in some portions of the program fail to occur, insertion of casts occur. The inserted casts give rise to passive and active checkers for the particular property.

Two examples of specifying properties with type environments are presented with checks for division by zero and integer overflow. Various cases are discussed where different type environments can be combined to simultaneously check different properties.

Simple Language with Casts CSimpL

Semantics and a type system for an imperative language with casts, CSimpL, are described below, which allows for demonstrating active type checking.

A value v is either an integer i or a Boolean constant b. An operand o is either a value or a variable reference x. An expression e is either an operand or an operator application $op(o_1 \ldots o_n)$ for some operator name op and operands $o_1 \ldots o_n$. An operator denotation $\tilde{}$ is a partial function from tuples of values to a value. A concrete store $\Delta$ is a map from variables and operator names to values and operator denotations respectively.

CSimpL supports integer refinement and Boolean types. Type Bool classifies Boolean expressions and Boolean values true and false. Integer refinement types have the form {x: Int|t} for some Boolean expression t whose only free variable may be x. A refinement type denotes the set of integers that satisfy the Boolean expression. A refinement type T is said to be a subtype of a refinement type S, written T<: S, if the denotation of T is a subset of the denotation of S. A value v is said to have type T, written v∈T, either if v is a Boolean value and T is Bool or if v is an integer in the denotation of T. Note that this value typing relation is decidable.

A type environment Γ is a map from variables and operator names to types and operator signatures respectively. An operator signature has the form $op(S1 \ldots S_n)$: T where $S1 \ldots S_n$ are the types of the parameters and T is the type of the result. A cast set G is a type environment whose domain contains only variables.

As described herein, a concrete store $\Delta$ corresponds to a type environment Γ, written $\Delta \in \Gamma$ if for any variable x, one has $\Delta(x) \in \Gamma(x)$ and for any operator op, one has $\Gamma(op)=op(S_1 \ldots S_n)$: T and $\Delta(op)=\tilde{}$ with such that $\tilde{}$ defined on any value tuple $v_1 \ldots v_n$ $v_i \in S_i$ for $0 < I \leq n$ and $\tilde{}$ $(v_1 \ldots v_n) \in T$. A concrete store $\Delta$ satisfies a cast set G, written $\Delta \in G$, if for any variable x in the domain of G, we have $\Delta(x) \in G(x)$.

Given two refinement types T={x: Int|$t_1$} and S={x: Int|$t_2$}, the intersection of T and S, denoted T∩S is defined to be the refinement type T={x: Int|$t_1 \wedge t_2$}. Assuming that two type environments $\Gamma_1$ and $\Gamma_2$ agree on the return types of operators, $\Gamma_1 \cap \Gamma_2$ is defined point-wise.

A program C consists of commands and is defined by the following grammar:

$$C, C' ::= \text{stop}$$
$$| (G)x := <T> e; C$$
$$| (G) \text{ if } e \text{ then } C \text{ else } C'$$

In this example, each non-halting command is annotated with a cast set specifying the type assumptions that must be checked dynamically before the command is executed. Additionally, the assignment command also specifies a cast on the right hand side expression.

FIG. 3 defines the static semantics of CSimpL. It is given by exemplary typing 300, more specifically, program typing judgment ⊢C, which states that program C is well-typed in type environment Γ, and the expression typing judgment ⊢e: T which states that expression e is of type T in type environment Γ. The T-IF and T-ASN rules describe how to check a non-halting command. The premises of these rules are checked in a type environment extended with the assumptions specified in cast set of the current command. The judgment defined in FIG. 3 is not algorithmic because the subsumption rule T-SUB is not syntax-directed.

FIG. 4 shows an exemplary concrete evaluation that defines the dynamic semantics of CSimpL. It is given by the small-step program evaluation judgment <C,$\Delta$>→<C',$\Delta$'> and the big-step expression evaluation judgment $\Delta$⊢e→v. The evaluation of a command proceeds by first ensuring that its associated cast set is satisfied by the current environment. When this succeeds, the command's subexpressions are evaluated so that the program can make a small step. For example, the E-ASN rule describes how the assignment command is executed: after the cast set is validated, the right hand side expression is evaluated and the obtained value is checked against the associated type T. If this check succeeds, the concrete store is updated and the program moves on to the next command.

A command C contains a failed cast under $\Delta$ either if the cast set of C is not satisfied by $\Delta$ or if C is of the form (G)x:=<T>e; C with e evaluating to some value v such that v∉T.

Theorem 3. (Type preservation.) Let $\Delta$ and Γ be a concrete store and a type environment such that $\Delta \in \Gamma$. Then the following two properties hold:
1. If Γ⊢e: T and $\Delta$⊢e→v, then Γ⊢v:T.
2. If Γ⊢C and <C,$\Delta$>→<C',$\Delta$'>, then Γ⊢C' and $\Delta' \in \Gamma$.

Theorem 4. (Progress.) Let $\Delta$ and Γ be a concrete store and a type environment such that $\Delta \in \Gamma$. If Γ⊢C, then either <C,$\Delta$>→<C',$\Delta$'>, or C contains a failed cast under $\Delta$.

Casts Insertion

The typing relation defined above does not give an algorithm for checking whether an arbitrary program is well-typed because it relies on checking subtyping which is undecidable in general. In practice, it is common to use a theorem prover that can validate or invalidate some subtyping assumptions and fail to produce a definitive answer on others. As described herein, a theorem prover is modeled by an algorithmic subtyping relation that, given two refinement types T and S, can either fail to produce an answer, written $T<:_{alg}^? S$, return true, written $T<:_{alg}^{ok} S$, or return false, written $T\not<:_{alg}^{ok} S$ such that $T<:_{alg}^{ok} S$ and $T\not<:_{alg}^{ok} S$ imply $T<: S$ and $T\not<: S$ respectively.

FIG. 5 shows an exemplary compliation as how with the help of such an algorithmic sub-typing relation, a compilation algorithm can be defined that instruments a given program with a sufficient number of casts to make it verifiably well-typed. The algorithm is comprised of the program compilation judgment $\Gamma \vdash C \Rightarrow C'$, which states that program C is compiled into program C' under type environment $\Gamma$, and the algorithmic expression typing judgment $\Gamma \vdash e: T \Rightarrow G$, which states that expression e has type T in type environment $\Gamma$ provided that the type assumptions in cast set G are satisfied. The compilation algorithm is partial: given a type environment $\Gamma$ and a program C there may not exist a program C' such that $\Gamma \vdash C \Rightarrow C'$. Such a situation is denoted by $\Gamma \vdash C \Rightarrow \bot$.

The following two theorems establish the static properties of the compilation algorithm:

Theorem 5. (Well-typed compilation.) If $\Gamma \vdash C \Rightarrow C'$, then $\Gamma \vdash C$.

Theorem 6. (Compilation Rejects Only Ill-Typed Programs.) If $\Gamma \vdash C \Rightarrow \bot$, then $\Gamma \not\vdash C$.

To show that the compiled program and the result of the compilation are equivalent at run-time, a k-step evaluation relation is first introduced. A program $C_0$ and a store $\Delta_0$ are said to make k steps producing a program $C_k$ and a store $\Delta_k$, written $C_0, \Delta_0 \rightarrow^k \langle C_k, \Delta_k \rangle$, if $\langle C_i, \Delta_i \rangle \rightarrow \langle C_{i+1}, \Delta_{i+1} \rangle$ for $0 \leq i \leq k$.

The following theorem establishes that the result of the compilation algorithm is equivalent to the original program by stating that if the latter can make k steps then the former either can make exactly the same k steps or fail on an inserted cast along the road:

Theorem 7. (Semantic preservation.) If $\Gamma \vdash C_0 \Rightarrow C_0'$ and $\langle C_0, \Delta \rangle \rightarrow^k \langle C_k, \Delta_k \rangle$, then either $\langle C_0', \Delta \rangle \rightarrow^k \langle C_k', \Delta_k \rangle$, or $\langle C_0', \Delta \rangle \rightarrow^i \langle C_i', \Delta_i \rangle$ and $C_i'$ contains a failed cast under $\Delta_i$ for some $0 \leq i \leq k$.

Active Checking via Symbolic Evaluation

Below, an exemplary side-by-side symbolic and concrete evaluation of a compiled program is described with casts constructs both path constraints and active checker constraints.

This approach introduces two auxiliary judgments for use in the definition of the side-by-side evaluation judgment. A symbolic value sv has type T provided that an input constraint $\phi$ is satisfied, written $sv \in T \Rightarrow \phi$, if $T=\{x: Int | t\}$ and $t[x:=sv]$ where $t[x:=sv]$ denotes a Boolean expression obtained by substituting sv for x. This judgment is referred to herein as symbolic value typing.

A symbolic store $\Sigma$ is said to satisfy a cast set G provided that an input constraint set $\phi$ is satisfied, written $\Sigma \vdash G \Rightarrow \phi$, if for any variable x in the domain of G, one has $\Sigma(x) \in G(x) \Rightarrow \phi_x$ and $\phi = \cup_x \{\phi_x\}$. This judgment is referred to herein as symbolic cast checking.

FIG. 6 shows an exemplary side-by-side evaluation. It is given by the single-step side-by-side program evaluation judgment $\langle C, \Delta, \Sigma, pc \rangle \rightarrow \langle C', \Delta', \Sigma', pc' \rangle \cdot \phi$ and by the symbolic expression evaluation judgment $\Sigma \vdash e \rightarrow sv$. The former states that a configuration consisting of a program C, a concrete store $\Delta$, a symbolic store $\Sigma$, and a path condition pc symbolically evaluates to a configuration $\langle C', \Delta', \Sigma', pc' \rangle$ producing a set of input constraints $\phi$. The intuition behind $\phi$ is that if any constraint $\phi \in \phi$ is invalidated by some input then this input will cause the program to fail on a cast. The symbolic evaluation judgment defines how an expression e evaluates to a symbolic value sv in a symbolic store $\Sigma$. Rules defining this judgment are straightforward and not elaborated herein.

The side-by-side program evaluation rules are defined in terms of the concrete evaluation judgments discussed above. The concrete evaluation rules can be recovered by removing all the symbolic artifacts from the side-by-side rules. The rule X-IF1 and X-IF2 are similar to the corresponding rules described above. The key difference here is that we use the cast checking judgment $\Sigma \vdash G \Rightarrow \phi$ which is a set of symbolic values which abstract the concrete type membership checks performed to satisfy G.

The path constraints and the cast checking constraints generated by side-by-side evaluation can be used to compute concrete inputs which drive the program to a failed cast. We write $\Sigma \circ \vec{\alpha} \rightarrow \Delta$ to represent substituting input parameters by values and then reducing each entry of $\Sigma$ to obtain a concrete store. One can write $\vec{a}(\phi) \rightarrow v$ to mean substituting values for variables in $\phi$ and reducing to a value. For a concrete store $\Delta$, one can write $\Delta \prec \Sigma$ if there exists an $\vec{\alpha}$ that reduces $\Sigma$ to $\Delta$.

One can now prove that a checker constraint generated at a program point is an active checker for the property of failing a runtime type membership check. That is, if one takes a path constraint pc and a constraint $\phi \in \phi$, then $pc \wedge \neg \phi$ is satisfiable if and only if there is some execution along the same path that causes a runtime check to fail. The main idea is that this should hold because $\phi$ is an abstraction of the run-time membership check. This is stated formally as follows:

Theorem 8. (Soundness and Completeness of Active Type Checking.) Let $\Delta_0$ and $\Sigma_0$ be concrete and symbolic stores such that $\Delta_0 \prec \Sigma_0$, and let $\Gamma$ be a type environment such that $\Delta_0 \in \Gamma$. Let $pc_0$ be a path constraint. Let $\Gamma \vdash C_0$, and $\langle C_0, \Delta_0, \Sigma_0, pc_0 \rangle \rightarrow^k \langle C_k, \Delta_k, \Sigma_k, pc_k \rangle \cdot \phi$. Then:

1. If there exists an input assignment $\vec{\alpha}$ such that $\vec{\alpha}(pc_k \wedge \neg \phi) \rightarrow true$ with $\Sigma_0 \circ \vec{\alpha} \rightarrow \Delta_0'$ for some $\phi \in \phi$, then $\langle C_0, \Delta_0' \rangle \rightarrow^i \langle C_i, \Delta_i' \rangle$ and $C_i$ contains a failed cast under $\Delta_i'$ for some $0 \leq i \leq k$.

2. If there exists an input $\vec{\alpha}$ such that $\vec{\alpha}(pc_0) \rightarrow true$ and $\Sigma_0 \circ \vec{\alpha} \rightarrow \Delta_0'$ with $\langle C_0, \Delta_0' \rangle \rightarrow^k \langle C_k, \Delta_k' \rangle$ where $C_k$ contains a failed cast under $\Delta_k'$, then $\vec{\alpha}(pc_k \wedge \neg \phi) \rightarrow true$ for some $\phi \in \phi$.

Some Active Checker Examples

Division by Zero. As an example, an active checker for division by zero errors is described. First, the refinement type notzero is defined as the set of values x of type Int such that $x \neq 0$. Then, the type of the division operator div is defined as taking an Int and a notzero argument. Finally, a semantic implementation function for division is needed, which in this example is the standard division function for integers. These are shown as exemplary type and implementation for the division operator:

```
notzero : {x: Int|x0}
= div : op(int,notzero): int
div(n1 ,n2) = n1/n2
```

FIG. 7 shows an example of active checking of a small program for division by zero errors 700. The original program 710 includes several lines of code (lines 1 through 3) before type-checking and compilation. Next static type checking and typecast insertion is performed. Because div is an operator, at line 3, by the type rule T-OP, it must be shown that the type of $x_1$ is a subtype of notzero to prove that the program is well-typed. Therefore, during compilation, an exemplary approach either statically proves this is the case, has the algorithmic implication judgment time out, or else statically rejects this program as ill-typed. For the purpose of this example, it is assumed that the algorithmic implication judgment times out, and so a cast to the type notzero is added. The code 720 shows the resulting code after cast insertion. Finally, suppose the code is run on the concrete input $\alpha=2$. The results 730 shows pc and $\phi$ after each command is evaluated. After the first run, this approach then extracts $\alpha \neq 0$ from $\phi$ and query $(\alpha > -5) \wedge \neg (\alpha \neq 0)$ to a constraint solver to actively check for an input that causes division by zero.

Overall, the example of FIG. 7 involves providing code, type checking and typecast insertion (e.g., adding a cast to a particular type) and then executing the code for a concrete input. After execution of the code (with cast insertion), a constraint solver actively checks for an input that causes the checked for issue, which in the foregoing example is division by zero.

Integer overflow/underflow. Integer overflow and underflow and related machine arithmetic errors are a frequent cause of security-critical bugs. As described herein, an exemplary approach defines upper and lower bounds for signed and unsigned integer types and then inserts a check whenever a potentially unsafe assignment is carried out. This approach then follows by capturing these checks with exemplary refinement types 800 of FIG. 8 [FIG. 9 in paper]. Given a type environment $\Gamma_{int}$ with these types, compilation will automatically insert casts for assignments between variables of different types. For example, suppose that a variable x has type uint8_t. Then an assignment of an expression e to x may insert a cast <uint8_t> if the algorithmic implication judgment cannot decide statically whether the value of e falls within the bounds of uint8_t or not. At runtime, the cast <uint8_t>e checks that the concrete value of the expression e is between 0 and $2^8$. If the runtime check succeeds, then this approach symbolically evaluates e to obtain a symbolic expression $sv_e$ and then adds the expression $(0 \leq sv_e < 2^8)$ to the set of checkers ch. It can be stated then that query $pc \wedge \neg (0 \leq sv_e < 2^8)$ to a constraint solver and solve for an input that violates the type bounds.

Combining Checkers

Finally, attention is focused on the question of combining checkers for different integer refinement properties. The following definition defines what it means for one environment to be a restriction of another.

Definition 3. (Environment restriction.) It can be stated that $\Gamma <: \Gamma'$ if the following two conditions hold:
1. If $\Gamma \vdash x_i: S_i$, and $\Gamma' \vdash x_i: S_i'$ for some $x_i$, then $S_i <: S_i'$
2. If $\Gamma \vdash op(T_1 \ldots T_n): T$ and $\Gamma' \vdash op(T_1' \ldots T_n'): T'$ for some operator op, then $T_i <: T_i'$ for $1 \leq i \leq n$.

It is desirable to ensure that a restricted environment provides for more checking. In particular, if two environments $\Gamma$ and $\Gamma'$ are used, where $\Gamma <: \Gamma'$, to insert casts into the same program, it is desirable to ensure that $\Gamma$ does not "disable" the casts inserted by $\Gamma'$. The following lemma states this formally:

Lemma 1. (Monotonicity.) If $\Gamma <: \Gamma'$, then the following properties hold:
1. If $\Gamma \vdash C$ and $\Delta \in \Gamma$, then $\Gamma' \vdash C$ and $\Delta \in \Gamma'$.
2. Let $\Gamma \vdash C_0 \Rightarrow C_0'$ and $\Gamma' \vdash C_0 \Rightarrow C_0''$. Let $\Delta_0$ be a concrete store such that $\Delta_0 \in \Gamma$. Then if $<C_0', \Delta_0> \rightarrow^k <C_k', \Delta_k>$, and $C_k'$ contains a failed cast under $\Delta_k$, then $<C_0'', \Delta_0> \rightarrow^i <C_i'', \Delta_i>$ and $C_i''$ contains a failed cast under $\Delta_i$, for some $0 \leq i \leq k$.

Suppose one wants to check both integer overflow and division by zero simultaneously where existing type environments $\Gamma_{int}$ and $\Gamma_{div}$ exist that check each property individually. By this setup, it is desirable to construct a new type environment $\Gamma$ such that if a program compiled with $\Gamma_{int}$ fails on some input, then the same program compiled with $\Gamma$ fails on that input, and similarly for $\Gamma_{div}$. The following lemma indicates that the intersection $\Gamma = \Gamma_{int} \cap \Gamma_{div}$ is a restriction of both $\Gamma_{int}$ and $\Gamma_{div}$:

Lemma 2. (Intersection is restriction.) Let $\Gamma = \Gamma_1 \cap \Gamma_2$. Then $\Gamma <: \Gamma_1$ and $\Gamma <: \Gamma_2$.

Together with the monotonicity property, this gives a desired result. Specifically, to check both properties, an exemplary approach compiles with the intersection environment, giving the following theorem:

Theorem 9. (Combination.) Let $\Gamma_a$ and $\Gamma_b$ be type environments, and let $\Gamma = \Gamma_a \cap \Gamma_b$. Let C be a program and let $\Gamma_a \vdash C \Rightarrow C_a$, and $\Gamma_b \vdash C \Rightarrow C_b$, and $\Gamma \vdash C \Rightarrow C_0'$. Let $\Delta_0$ be a concrete store such that $\Delta_0 \in \Gamma$. If $<C_0, \Delta_0> \rightarrow^k <C_k, \Delta_k>$ and $C_k$ contains a failed cast under $\Delta_k$, where $C_0$ is either $C_a$ or $C_b$, then $<C_0', \Delta_0> \rightarrow^i <C_i', \Delta_i>$, and $C_i'$ contains a failed cast under $\Delta_i$, for $0 \leq i \leq k$.

Some Optimizations

Active checkers can be viewed as injecting additional constraints in path constraints in order to refine the partitioning on input values. In practice, active checkers may inject many such constraints all over program executions, making path explosion even worse than with path exploration alone. Hence, described below several optimizations are presented to help make active checking tractable in practice.

Minimizing Calls to the Constraint Solver

As already discussed, (negations of) constraints injected by various active checkers in a same path constraint can be solved independently one-by-one since they have no side effects. This is called a naive combination of checker constraints.

However, the number of calls to the constraint solver can be reduced by bundling together constraints injected at the same or equivalent program states into a single conjunction. If pc denotes the path constraint for a given program state, and $\phi_{C1}, \ldots, \phi_{Cn}$ are a set of constraints injected in that state by each of the active checkers, one can define the combination of these active checkers by injecting the formula $\phi_C = \phi_{C1} \wedge \ldots \wedge \phi_{Cn}$ in the path constraint, which will result in the single query $pc \wedge (\neg \phi_{C1} \vee \ldots \vee \neg \phi_{Cn})$ to the constraint solver. As described herein, one can also bundle in the same conjunction constraints $\phi_{Ci}$ injected by active checkers at different program states anywhere in between two conditional statements, i.e., anywhere between two constraints in the path constraint (since those program states are indistinguishable by that path constraint). This combination reduces the number of calls to the constraint solver but, if the query $pc \wedge )\neg \phi_{C1} \vee \ldots \vee \neg \phi_{Cn})$ is satisfied, a satisfying assignment produced by the constraint solver may not satisfy all the disjuncts, i.e., it may violate only some of the properties being checked. Hence, this is called a weakly-sound combination.

A strongly-sound, or "sound" for short, combination can be obtained by making additional calls to the constraint solver using the procedure or function:

Procedure CombineActiveCheckers(I, pc, $\phi_{C1}, \ldots, \phi_{Cn}$):
Let x=Solve(pc $\wedge$ ($\neg \phi_{C1} \vee \ldots \vee \neg \phi_{Cn}$))
If x=UNSAT return I
For all i in [1,n], eliminate $\phi_{Ci}$ if x satisfies $\neg \phi_{Ci}$
Let $\phi_{C1}, \ldots, \phi_{Cm}$ denote the remaining $\phi_{Ci}$ (m<n)
If m=0, return I$\cup\{$X$\}$
Call CombineActiveCheckers(I$\cup\{$x$\}$, $\phi_{C1}, \ldots, \phi_{Cm}$)

The foregoing function can be called to compute a strongly-sound combination of active checkers. For example, one can call CombineActiveCheckers(∅, pc, $\phi_{C1}$, ..., $\phi_{Cn}$) where this call returns a set I of input values that covers all the disjuncts that are satisfiable in the formula pc∧(¬$\phi_{C1}$ ∨ ... ∨ ¬$\phi_{Cn}$). The function first queries the solver with the disjunction of all the checker constraints (line 1). If the solver returns UNSAT, it is known that all of these constraints are unsatisfiable (line 2). Otherwise, it is possible to check the solution x returned by the constraint solver against each checker constraint to determine which are satisfied by solution x (line 3). (This is a model-checking check, not a satisfiability check; in practice, this can be implemented by calling the constraint solver with the formula $\wedge_i$ ($b_i$ ⇔ ¬$\phi_{Ci}$) ∧ pc ∧ ($\vee_i b_i$) where $b_i$ is a fresh Boolean variable which evaluates to true iff ¬$\phi_{Ci}$ is satisfied by a satisfying assignment x returned by the constraint solver; determining which checker constraints are satisfied by x can then be performed by looking up the values of the corresponding bits $b_i$ in solution x). Then, removal of these checker constraints from the disjunction (line 4) can be performed and a query issued to the solver again until all checker constraints that can be satisfied have been satisfied by some input value in I. If t out of the n checkers can be satisfied in conjunction with the path constraint pc, this function requires at most min(t+1, n) calls to the constraint solver, because each call removes at least one checker from consideration. Obtaining strong soundness with fewer than t calls to the constraint solver is not possible in the worse case. Note that the naive combination defined above is strongly-sound, but always requires n calls to the constraint solver.

It is worth emphasizing that none of these combination strategies attempt to minimize the number of input values (solutions) needed to cover all the satisfiable disjuncts. This could be accomplished by querying first the constraint solver with the conjunction of all checker constraints to check whether any solution satisfies all these constraints simultaneously, i.e., to check whether their intersection is non-empty. Otherwise, one could then iteratively query the solver with smaller and smaller conjunctions to force the solver to return a minimum set of satisfying assignments that cover all the checker constraints. This procedure may require in the worse case O ($2^n$) calls to the constraint solver; noting that the problem can be shown to be NP-complete by a reduction from the NP-hard SET-COVER problem.

Weakly and strongly sound combinations capture possible overlaps, inconsistencies or redundancies between active checkers at equivalent program states, but is independent of how each checker is specified: it can be applied to any active checker that injects a formula at a given program state. Also, the above definition is independent of the specific reasoning capability of the constraint solver. In particular, the constraint solver may or may not be able to reason precisely about combined theories (abstract domains and decision procedures) obtained by combining individual constraints injected by different active checkers. However, as described herein, any level of precision is acceptable and useful.

Some Minimizing Formulas

In general, minimizing the number of calls to the constraint solver should not be achieved at the expense of using longer formulas. Various exemplary strategies, described above, for combining constraints injected by active checkers can also reduce formula sizes.

For instance, consider a path constraint pc and a set of n constraints $\phi_{C1}$ ... $\phi_{Cn}$ to be injected at the end of pc. The naive combination makes n calls to the constraint solver, each with a formula of length |pc|+|$\phi_{Ci}$|, for all 1≤i≤n. In contrast, the weak combination makes only a single call to the constraint solver with a formula of size |pc|+$\Sigma_{1 \le i \le n}$|$\phi_{Ci}$|, i.e., a formula (typically much) smaller than the sum of the formula sizes with the naive combination. The strong combination makes, in the worse case, n calls to the constraint solver with formulas of size |pc|+$\Sigma_{1 \le i \le j}$|$\phi_{Ci}$| for all 1≤j≤n, i.e., possibly bigger formulas than the naive combination. But often, the strong combination makes fewer calls than the naive combination, and matches the weak combination in the best case (when none of the disjuncts ¬$\phi_{Ci}$ are satisfiable).

In practice, path constraints pc tend to be long, much longer than injected constraints $\phi_{Ci}$. A simple optimization includes eliminating the constraints in pc which do not share symbolic variables (including by transitivity) with the negated constraint c to be satisfied. This unrelated constraint elimination can be done syntactically by constructing an undirected graph G with one node per constraint in pc∪{c} and one node per symbolic (input) variable such that there is an edge between a constraint and a variable iff the variable appears in the constraint. Then, starting from the node corresponding to constraint c, one performs a (linear-time) traversal of the graph to determine with constraints c' in pc are reachable from c in G. At the end of the traversal, only the constraints c' that have been visited are kept in the conjunction sent to the constraint solver, while the others are eliminated.

With unrelated constraint elimination and the naive checker combination, the size of the reduced path constraint $pc_i$ may vary when computed starting from each of the n constraints $\phi_{Ci}$ injected by the active checkers. In this case, n calls to the constraint solver are made with the formulas $pc_i \wedge \neg \phi_{Ci}$, for all 1≤i≤n. In contrast, the weak combination makes a single call to the constraint solver with the formula pc'∧($\vee_i \neg \phi_{Ci}$) where pc' denotes the reduced path constraint computed when starting with the constraint $\vee_i \neg \phi_{Ci}$. It may be shown that |pc'|≤$\Sigma_i$|$pc_i$|, and therefore that the formula used with the weak combination is again smaller than the sum of the formula sizes used with the naive combination. Loosely speaking, the strong combination includes again both the naive and weak combinations as two possible extremes.

Some Caching Strategies

Regardless of the chosen strategy for combining checkers at a single program point, constraint caching can significantly reduce the overhead of using active checkers.

To illustrate the benefits of constraint caching, consider a NULL dereference active checker and the program Q:

```
1 #define k 100 // constant
2 void Q(int *x, int a[k]){ // inputs
3 int tmp1,tmp2,i;
4 if (x == NULL) return;
5 for (i=0; i<=k;i++) {
6 if (a[i]>0) tmp1 = tmp2+*x;
7 else tmp2 = tmp1+*x;
8 }
9 return;
10}
```

This program has O($2^k$) possible execution paths. A naive application of a NULL dereference active checker results in O(k$2^k$) additional calls to the constraint solver, while local constraint caching eliminates the need for any additional calls to the constraint solver.

More specifically, program Q has $2^k$+1 executions, where $2^k$ of those dereference the input pointer x k times each. A naive approach to dynamic test generation with a NULL dereference active checker would inject k constraints of the form x≠NULL at each dereference of *x during every such execution of Q, which would result in a total of k·$2^k$ additional calls to the constraint solver (i.e., k calls for each of those executions).

To limit this expensive number of calls to the constraint solver, a first optimization consists of locally caching constraints in the current path constraint in such a way that syntactically identical constraints are never injected more than once in any path constraint; noting that path constraints are generally simply conjunctions. Such an optimization is applicable to any path constraint, with or without active checkers. The correctness of this optimization is based on the following observation: if a constraint c is added to a path constraint pc, then for any longer pc' extending pc, one has pc' $\Rightarrow$ pc (where $\Rightarrow$ denotes logical implication) and pc' $\wedge \neg$ c will always be unsatisfiable because c is in pc'. In other words, adding the same constraint multiple times in a path constraint is pointless since only the negation of its first occurrence has a chance to be satisfiable.

Constraints generated by active checkers can be dealt with by injecting those in the path constraint like regular constraints. Indeed, for any constraint c injected by an active checker either at the end of a path constraint pc or at the end of a longer path constraint pc' (i.e., such that pc' $\Rightarrow$ pc), the following holds:

if pc $\wedge \neg$ c is unsatisfiable, then pc' $\wedge \neg$ c is unsatisfiable; conversely, if pc' $\wedge \neg$ c is satisfiable, then pc $\wedge \neg$ c is satisfiable (and has the same solution).

Therefore, one can check $\neg$ c as early as possible, i.e., in conjunction with the shorter pc, by inserting the first occurrence of c in the path constraint. If an active checker injects the same constraint later in the path constraint, local caching will simply remove this second redundant occurrence.

By injecting constraints generated by active checkers into regular path constraints and by using local caching, a given constraint c, like x≠NULL in the previous example, will appear at most once in each path constraint, and a single call to the constraint solver will be made to check its satisfiability for each path, instead of k calls as with the naive approach without local caching. Moreover, because the constraint x≠NULL already appears in the path constraint due to the if statement on line 4 before any pointer dereference *x on lines 6 or 7, it will never be added again to the path constraint with local caching, and no additional calls will be made to the constraint solver due to the NULL pointer dereference active checker for this example.

Another optimization consists of caching constraints globally: whenever the constraint solver is called with a query, this query and its result are kept in a (hash) table shared between execution paths during a directed search. The effect of both local and global caching is measured empirically and discussed further below.

Examples of Active Checkers in SAGE

Various exemplary trials were performed. The trials implemented active checkers as part of a dynamic test generation tool called SAGE (Scalable, Automated, Guided Execution). The SAGE tool uses a tool called iDNA tool to trace executions of WINDOWS® programs, then virtually re-executes these traces with the TruScan trace replay framework. During re-execution, SAGE checks for file read operations and marks the resulting bytes as symbolic. As re-execution progresses, SAGE generates symbolic constraints for the path constraint. After re-execution completes, SAGE uses the constraint solver Disolver to generate new input values that will drive the program down new paths. SAGE then completes this cycle by testing and tracing the program on the newly generated inputs. The new execution traces obtained from those new inputs are sorted by the number of new code block they discover, and the highest ranked trace is expanded next to generate new test inputs and repeat the cycle. Note that SAGE does not perform any static analysis.

FIG. 9 shows various exemplary active checkers 900 that were implemented in SAGE. The trials reported herein were performed with 13 exemplary active checkers, as identified by Numbers 1 through 13 in FIG. 9; noting that zero denotes a regular constraint in a path constraint. Number 1 refers to a division-by-zero checker, Number 2 denotes a NULL pointer dereference checker, and Numbers 4 and 5 denote array underflow and overflow checkers. Number 3 refers to an active checker that looks for function arguments that have been annotated with the notnull attribute in the SAL property language, and attempts to force those to be NULL. Checker type Number 6 looks for the x86 REP MOVS instruction, which copies a range of bytes to a different range of bytes, and attempts to force a condition where the ranges overlap, causing unpredictable behavior. Checkers of Numbers 7 and 8 are for integer underflows and overflows. Checkers type of Numbers 9 and 10 target the MOVSX instruction, which sign-extends its argument and may lead to loading a very large value if the argument is negative. The "stack smash" checker, type of Number 11, attempts to solve for an input that directly overwrites the stack return pointer, given a pointer dereference that depends on a symbolic input. Finally, checkers type of Numbers 12 and 13 look for heap allocation functions with symbolic arguments; if found, they attempt to cause overflow or underflow of these arguments.

An active checker in SAGE first registers a TruScan callback for specific events that occur during re-execution. For example, an active checker can register a callback that fires each time a symbolic input is used as an address for a memory operation. The callback then inspects the concrete and symbolic state of the re-execution and decides whether or not to emit an active checker constraint. If the callback does emit such a constraint, SAGE stores it in the current path constraint.

SAGE implements a generational search: given a path constraint, all the constraints in that path are systematically negated one-by-one, placed in a conjunction with the prefix of the path constraint leading it, and attempted to be solved with the constraint solver. Constraints injected by active checkers are inserted in the path constraint and treated as regular constraints during a generational search.

Because trials pertain to x86 machine-code traces, some information desirable for use as part of an exemplary active checker approach is not immediately available. For example, when SAGE observes a load instruction with a symbolic offset during re-execution, it is not clear what the bound should be for the offset. As described herein, a work around for these limitations includes leveraging the TruScan infrastructure. During re-execution, TruScan observes calls to known allocator functions. By parsing the arguments to these calls and their return values, as well as detecting the current stack frame, TruScan builds a map from each concrete memory address to the bounds of the containing memory object. An exemplary approach uses the bounds associated with the memory object pointed to by the concrete value of the address as the upper and lower bound for an active bounds check of the memory access.

Evaluation

Trials were performed using an exemplary approach that extends SAGE with active checkers. This approach was applied to two media-parsing applications widely used on a WINDOWS® operating system.

FIG. 10 shows the result of a single symbolic execution and test generation task for each of these two test programs. The second column indicates which checkers injected constraints during that program execution. The last column gives the number of symbolic input bytes read during that single execution, which is 100 to 1,000 times larger than previously reported with dynamic test generation. Trials were also performed previously using SAGE and the same test programs among others, but without any active checkers.

For each application, microbenchmarks were run to quantify the marginal cost of active checking during a single symbolic execution task and to measure the effectiveness of various exemplary optimizations. Also performed were long-running SAGE searches with active checkers to investigate their effectiveness at finding bugs. These searches were performed on a 32-bit computing device with the WINDOWS® VISTA® operating system. The device included two dual-core AMD OPTERON® 270 processors running at 2 GHz, with 4 GB of RAM and a 230 GB hard drive; all four cores were used in each search.

Microbenchmarks

FIG. 11 shows exemplary statistics 1100 for the two test programs obtained with a single symbolic execution and test generation task with no active checkers, or the weak, strong and naive combinations of active checkers, as already discussed. For each run, the report includes the total run time (in seconds), the time spent in the constraint solver (in seconds), the number of test generated, the number of disjunctions bundling together checker constraints (if applicable) before calling the constraint solver, the minimum, mean and maximum number of constraints in disjunctions (if applicable), the total number of constraints in the path constraint, the total number of constraints injected by checkers, the number of calls made to the constraint solver, statistics about the size needed to represent all path and checker constraints (discussed further below) and the local cache hit. Each call to the constraint solver was set with a timeout value of 5 seconds. With respect to the mean and maximum number of constraints in disjunctions, in the strong case, the mean number does not include disjunctions iteratively produced by the algorithm of the CombineActiveChecker procedure, which is why the mean is the same as the weak case.

Exemplary trials demonstrate that active checkers produce more test cases than path exploration at a reasonable cost. As already explained, using checkers increases total run time but also generates more tests. For example, all checkers with naive combination for Media 2 create 5122 test cases in 1226 seconds, compared to 1117 test cases in 761 seconds for the case of no active checkers; this gives 4.5 times as many test cases for 61% more time spent in this case.

As explained, the naive combination generates more tests than the strong combination, which itself generates more tests than the weak combination. Perhaps surprisingly, most of the extra time is spent in symbolic execution, not in solving constraints. This may explain why the differences in runtime between the naive, strong and weak cases are relatively not that significant.

Trials were also run with a "basic" set of checkers that consisted only of Array Bounds and DivByZero active checkers; these trials produced fewer test cases, but had little to no runtime penalty for test generation for both test programs.

Exemplary trials demonstrated that the weak combination had the lowest overhead. Observations indicated that the solver time for weak combination of disjunctions was the lowest for Media 2 runs with active checkers and tied for lowest with the naive combination for Media 1. The strong disjunction generates more test cases, but surprisingly takes longer than the naive combination in both cases. For Media 1, this is due to the strong combination hitting one more 5-second timeout constraints than the naive combination. For Media 2, it is postulated that this is due to the overhead involved in constructing repeated disjunction queries. Because disjunctions in both cases have fairly few disjuncts on average (around 4 or 5), this overhead dominates for the strong combination, while the weak one is still able to make progress by handling the entire disjunction in one query.

Exemplary trials demonstrate that unrelated constraint elimination is important for checkers. The trial implementation of the unrelated constraint optimization introduces additional common subexpression variables. Each of these variable defines a subexpression that appears in more than one constraint. In the worst case, the maximum possible size of a list of constraints passed to the constraint solver is the sum of the number of these variables, plus the size of the path constraint, plus the number of checker constraints injected. Trials collected the maximum possible constraint list size (Max CtrList Size) and the mean size of constraint lists produced after our unrelated constraint optimization (Mean CtrList Size). The maximum possible size does not depend on choice of weak, strong, or naive combination, but the mean list size is slightly affected. In the Media 2 microbenchmarks, it was observed that the maximum possible size jumps dramatically with the addition of checkers, but that the mean size stays almost the same. Furthermore, even in the case without checkers, the mean list size was 100 times smaller than the maximum. The Media 1 case was less dramatic, but still showed post-optimization constraint lists an order of magnitude smaller than the maximum. These results show that unrelated constraint optimization is a key factor to be considered to efficiently implement active checkers.

Macrobenchmarks

For macrobenchmarks, SAGE was run for 10 hours starting from the same initial media file, and generated test cases with no checkers, and with the weak and strong combination of all 13 checkers. Each test case was then tested by running the program with AppVerifier, configured to check for heap errors. For each crashing test case, the checker kinds responsible for the constraints that generated the test were recorded. Since a SAGE search can generate many different test cases that exhibit the same bug, crashing files were bucketed by the stack hash of the crash, which included the address of the faulting instruction. Also reported was a bucket kind, which is a NULL pointer dereference, a read access violation (ReadAV), or a write access violation (WriteAV). It is possible for the same bug to be reachable by program paths with different stack hashes for the same root cause. The trials always reported the distinct stack hashes. Also computed was the hit rate for global caching during each SAGE search.

As demonstrated, checkers can find bugs missed by path exploration. FIG. 12 shows exemplary crash bucket information 1200 found for Media 2 by 10-hours SAGE searches with "No" active checkers, with a "W"eak and "S"trong combinations of active checkers. For instance, an "S" in a column means that at least one crash in the bucket was found by the search with strong combination. A total of 41658 tests were generated and tested in 30 hours, with 783 crashing files in 12 buckets.

The type of checkers whose constraint found the crash bucket is also indicated in FIG. 12. For Media 1, the Null Deref (type 2) active checker found 2 crash buckets, the Array Underflow and Overflow (types 4 and 5) active checkers found 3 crash buckets, while the Integer Underflow and Overflow (types 7 and 8) active checkers found 7 crash buckets. Without any active checkers, SAGE was able to find only 4 crash buckets in 10 hours of search, and misses the serious WriteAV bug detected by the strong combination only. FIG. 13 shows exemplary crash bucket information 1300 for Media 2 where a total of 11849 tests were generated and tested in 30 hours, with 25 crashing files in 4 buckets. In contrast, the test cases generated by active checkers for Media 2 did not find any new crash buckets.

As demonstrated, checker yield can vary widely. FIG. 14 shows a table of various injected constraints 1400 for Media 1 and Media 2. The table 1400 reports the overall number of injected constraints of each type during all 10-hours searches, and how many of those were successfully solved to create new test cases. It also reports the checker yield, or percentage of test cases that led to crashes. For Media 1, active checkers have a higher yield than test cases generated by path exploration (type 0). For Media 2, several checkers did inject constraints that were solvable, but their yield is 0% as they did not find any new bugs. The yield indicates how precise symbolic execution can be. For Media 1, symbolic execution is very precise as every checker constraint violation for checker types 2, 4 and 5 actually leads to a crash (as is the case with a fully sound and complete constraint generation and solving as already explained); even if symbolic execution was perfect, the yield for the integer under/overflow active checkers may be less than 100% because not every integer under/overflow leads to a crash. In contrast, the symbolic execution for Media 2 seems poor.

As demonstrated, local and global caching are effective. Local caching can remove a significant number of constraints during symbolic execution. For Media 1, an 80% or more local cache hit rate was observed (see FIG. 11). For Media 2, the hit rates were somewhat less impressive but still removed roughly 20% of the constraints.

To measure the impact of global caching on macrobenchmark runs, code was added that dumps to disk the SHA-1 hash of each query to the constraint solver, and then computes the global cache hit rate. For Media 1, all searches showed roughly a 93% hit rate, while for Media 2, 27% was observed. These results show that there are significant redundancies in queries made by different test generation tasks during the same SAGE search.

Additional Trials

Exploratory SAGE searches were performed on several other applications, including two shipped as part of MICROSOFT® OFFICE® 2007 applications and two media parsing layers. In one of the applications and media layer, the division by zero checker and the integer overflow checker each created test cases leading to previously-unknown division by zero errors. In the other cases, the trials also discovered new bugs in test cases created by checkers.

In general, the more one checks for property violations, the more one should find software errors. As described herein, active property checking is defined and trials performed using exemplary dynamic property checking methods based on dynamic symbolic execution, constraint solving and test generation. Trials demonstrate how active type checking extends conventional static and dynamic type checking. Various exemplary optimization techniques can implement active property checkers efficiently. Trial results for several large shipped WINDOWS® applications demonstrated how active property checking was able to detect several new bugs in those applications.

Exemplary Computing Device

Figure 15:
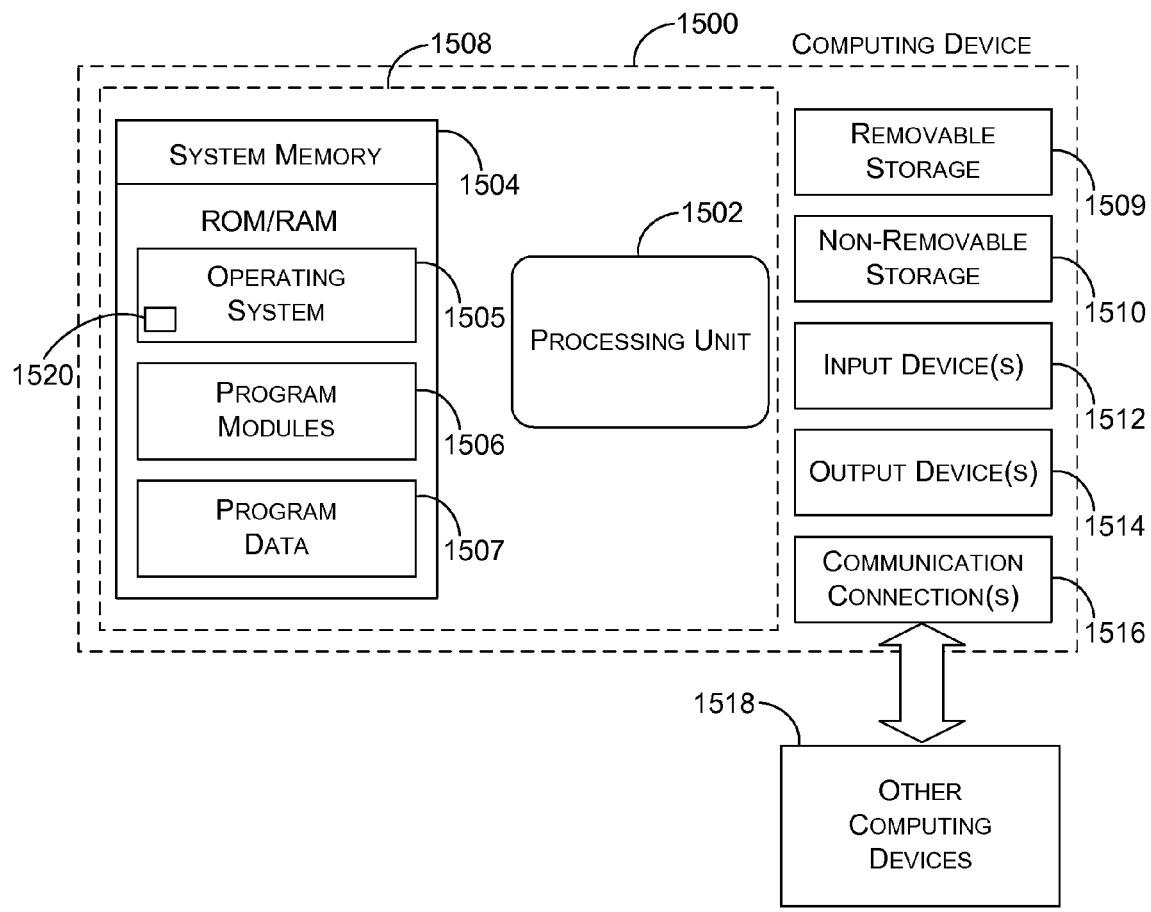
FIG. 15 is a block diagram of an exemplary computing device.

FIG. 15 illustrates an exemplary computing device 1500 that may be used to implement various exemplary methods and in forming an exemplary system. In a very basic configuration, computing device 1500 typically includes at least one processing unit 1502 and system memory 1504. Depending on the exact configuration and type of computing device, system memory 1504 may be volatile (such as RAM), non-volatile (such as ROM, flash memory, etc.) or some combination of the two. The at least one processing unit 1502 (or one or more processors) may be configured to execute instructions (e.g., processor executable instructions). System memory 1504 typically includes an operating system 1505, one or more program modules 1506, and may include program data 1507. The operating system 1505 include a component-based framework 1520 that supports components (including properties and events), objects, inheritance, polymorphism, reflection, and provides an object-oriented component-based application programming interface (API), such as that of the .NET™ Framework marketed by Microsoft Corporation, Redmond, Wash. The device 1500 is of a very basic configuration demarcated by a dashed line 1508. Again, a terminal may have fewer components but will interact with a computing device that may have such a basic configuration.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by removable storage 1509 and non-removable storage 1510. Computer storage media may include volatile and nonvolatile, removable and non-removable media implemented in any method or technology for storage of information, such as computer readable instructions, data structures, program modules, or other data. System memory 1504, removable storage 1509 and non-removable storage 1510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1500. Any such computer storage media may be part of device 1500. Computing device 1500 may also have input device(s) 1512 such as keyboard, mouse, pen, voice input device, touch input device, etc. Output device(s) 1514 such as a display, speakers, printer, etc. may also be included. These devices are well known in the art and need not be discussed at length here.

Computing device 1500 may also contain communication connections 1516 that allow the device to communicate with other computing devices 1518, such as over a network. Communication connections 1516 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by a computing device, comprising:
   in parallel with a normal execution of software being tested, performing a symbolic execution of the software being tested to identify one or more path constraints in the software;
   injecting one or more issue constraints into the software wherein each issue constraint is associated with at least one of the one or more path constraints and comprises a coded formula inserted into the software being tested;

solving the one or more issue constraints and the one or more path constraints using a constraint solver, the solving including providing at least one assignment that satisfies the one or more issue constraints and the one or more path constraints, wherein an existence of a solution to the one or more issue constraints and the one or more path constraints indicates a potential failure of the software;

based at least in part on the solving, generating at least one test input for testing the software based on the at least one assignment; and testing the software using the at least one test input to check for one or more violations of the injected one or more issue constraints, wherein the testing of the software using the at least one test input extends normal execution checking by checking for one or more issue constraint violations for program executions of the software that follow a same program path.

2. The method of claim 1, wherein the one or more issue constraints comprise one or more property constraints.

3. The method of claim 1, wherein the one or more path constraints comprise a sequence of constraints on input to the software.

4. The method of claim 1, wherein the one or more violations include a property violation.

5. The method of claim 1, wherein one or more active checkers perform the injecting of the one or more issue constraints into the software.

6. The method of claim 5, wherein the one or more active checkers include an active checker for division by zero.

7. The method of claim 5, wherein the one or more active checkers include an active checker for array bounds.

8. The method of claim 5, wherein the one or more active checkers include an active checker for Null pointer de-reference.

9. The method of claim 5, wherein the one or more active checkers include an active checker for a property that comprises a function that takes as input a finite program execution and returns a coded formula that is satisfied when there exists a finite program execution that violates the property.

10. The method of claim 9, wherein the finite program execution and the existing finite program execution adhere to a common path constraint.

11. The method of claim 1, wherein the solving identifies at least one concrete input that causes a runtime check of the software to fail.

12. The method of claim 1, wherein the generating comprises dynamic test generating that attempts to exercise each feasible path in at least a portion of the software.

13. The method of claim 1, further comprising optimizing the injection of the one or more issue constraints to minimize calls to the constraint solver.

14. The method of claim 1, further comprising implementing one or more caching schemes to reduce calls to the constraint solver.

15. A method, implemented by a computing device, comprising:

providing software being tested;

at runtime of the software, injecting one or more additional constraints into the software, the injecting including adding a cast to a type in the software wherein the cast pertains to an issue;

executing the software with the added cast for a concrete input; and actively checking for an input that causes the issue, wherein runtime testing is extended by actively checking for the input that causes the issue for program executions of the software that follow a same program path.

16. The method of claim 15, wherein the added cast gives rise to a checker for a property.

17. The method of claim 15, wherein the cast is to a type <nonzero>and wherein the issue comprises division by zero.

18. The method of claim 15, wherein the issue is selected from at least one of a division by zero, an underflow, and an overflow.

19. A system comprising:

one or more processors;

a memory; and one or more instructions stored in the memory and executable by the one or more processors to:

inject one or more constraints into software being tested, during symbolic execution of the software being tested, wherein each of the one or more constraints comprises a coded formula inserted into the software being tested such that an existence of a solution to the coded formula indicates a potential failure of the software being tested, solve the one or more constraints using a constraint solver, generate input for testing the software being tested based on the solution provided by the constraint solver, and test the software being tested using the generated input to check for violations of the one or more injected constraints, wherein testing of the software using the generated input extends testing by checking for violations of the one or more injected constraints for program executions of the software that follow a same program path.

20. The system of claim 19, wherein the one or more constraints are associated with one or more issues.

* * * * *